Nov. 7, 1933.   G. H. A. RUBY   1,933,934
BOARD MAKING MACHINE
Filed April 18, 1931   11 Sheets-Sheet 1
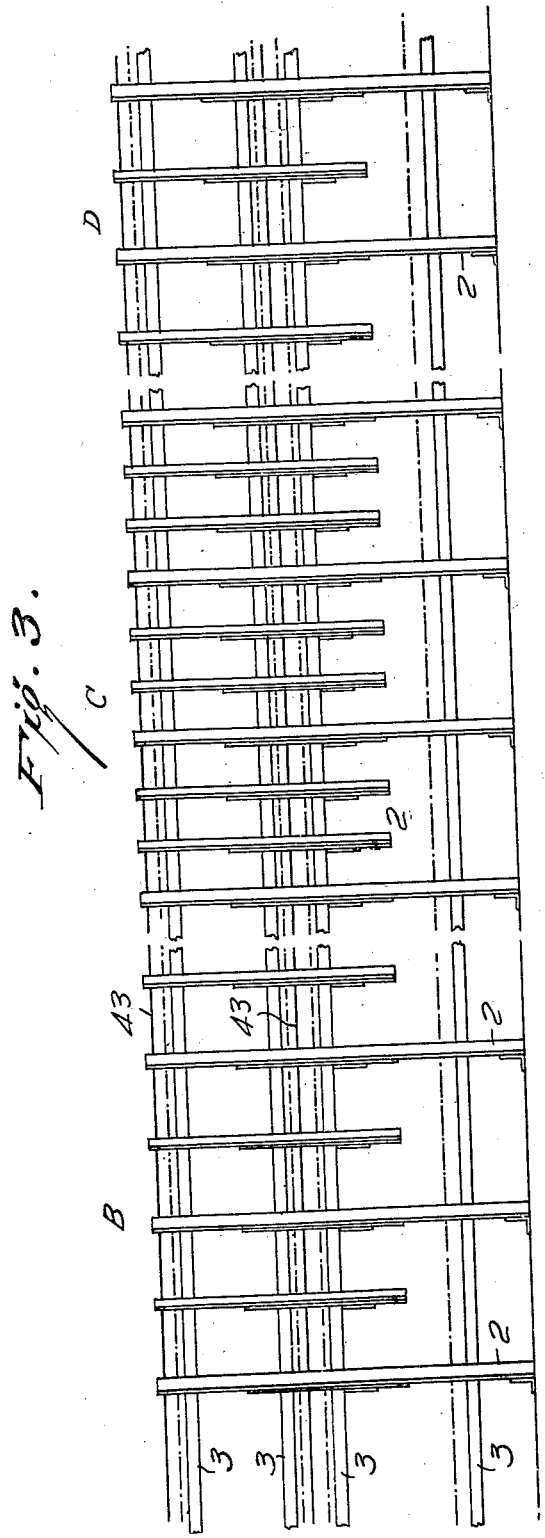
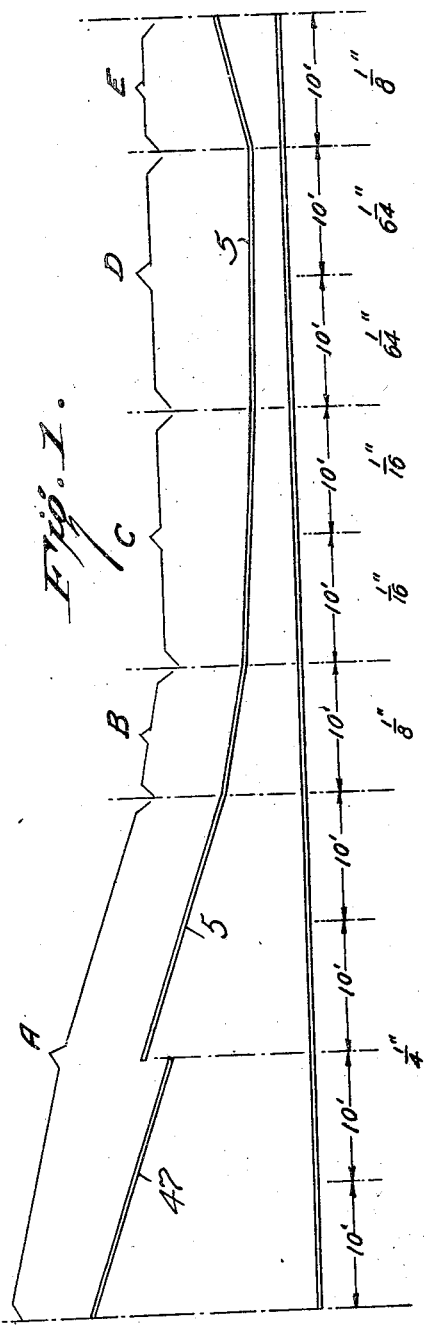
INVENTOR
G.H.A. RUBY,
BY
ATTORNEY

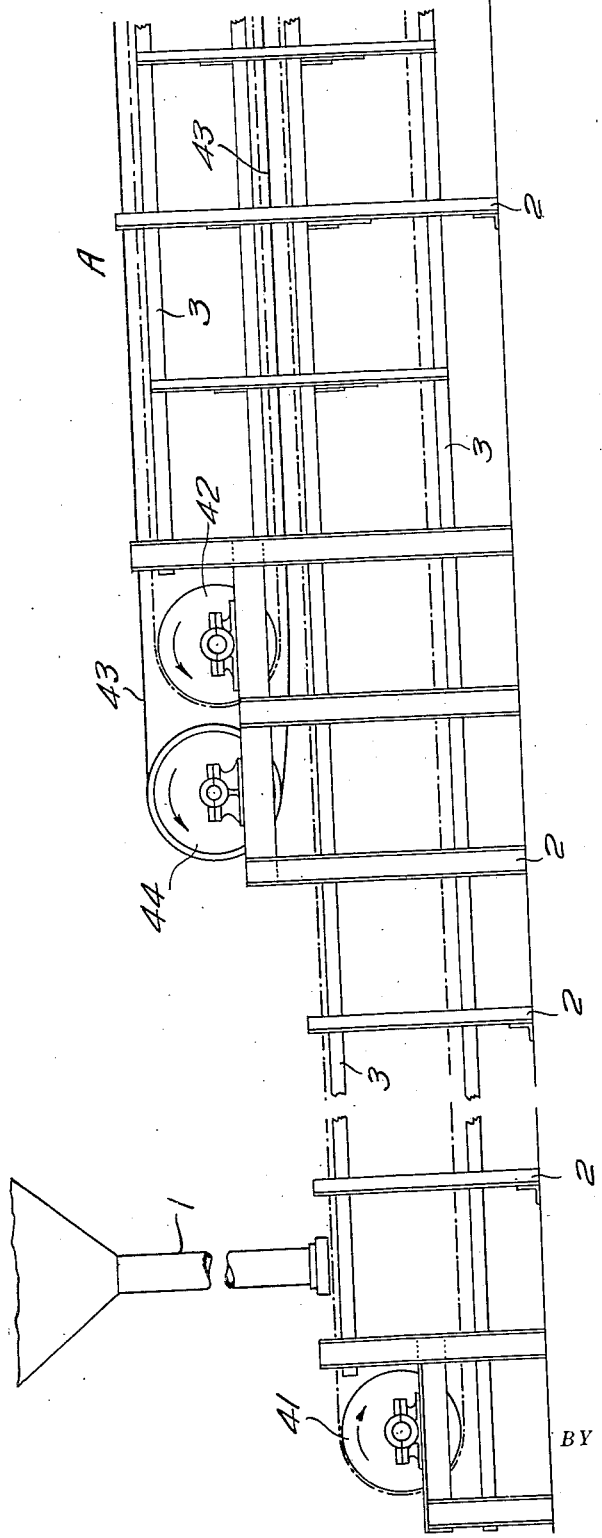

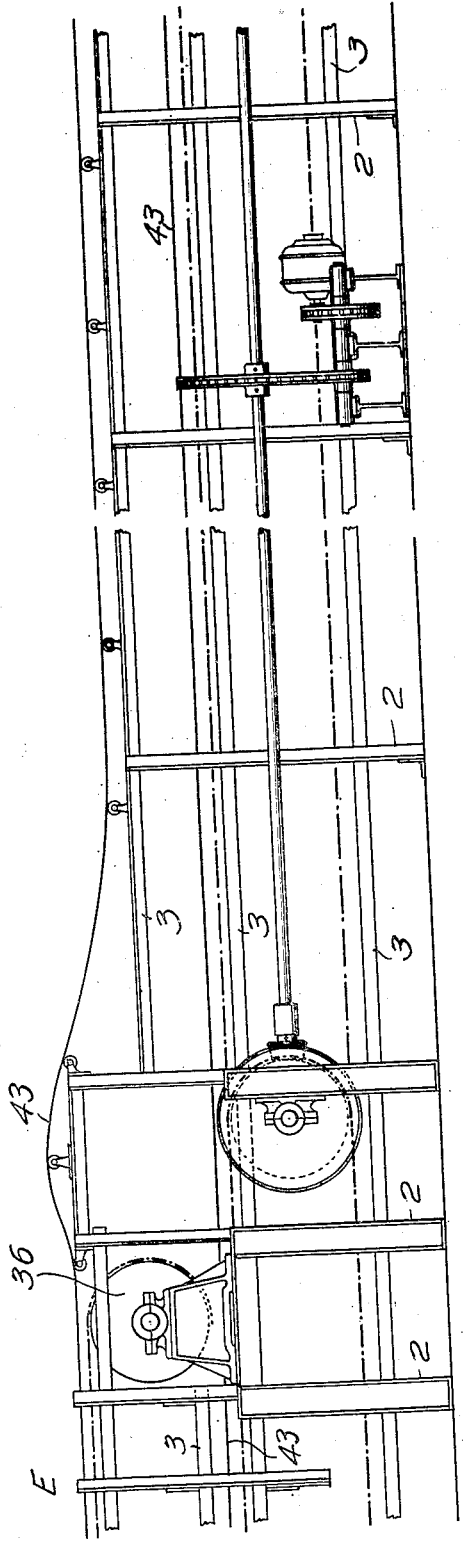

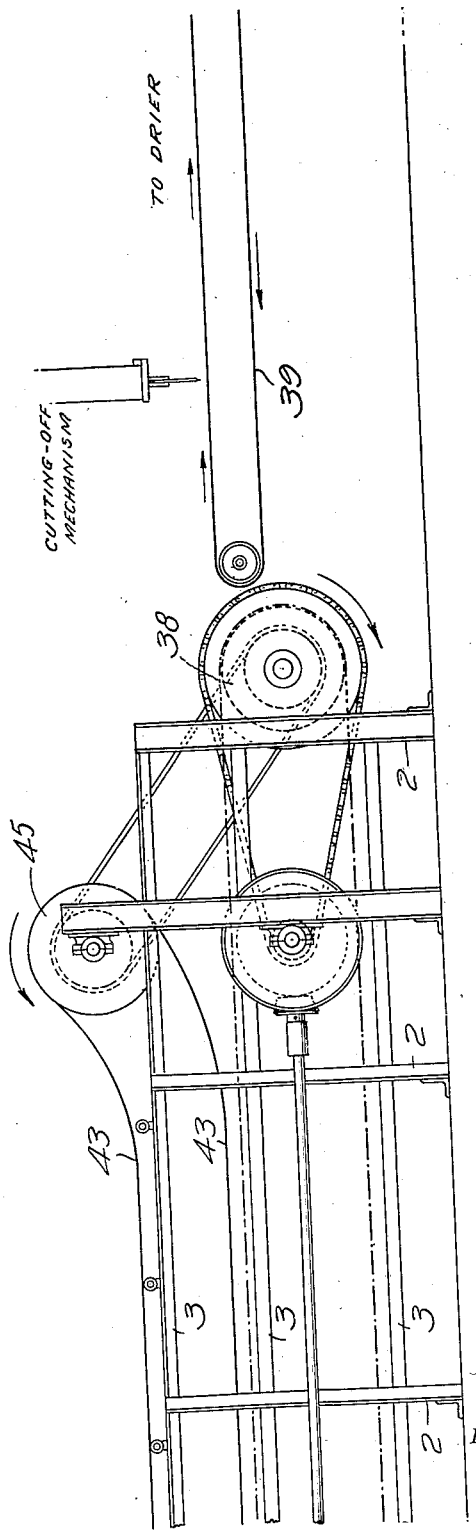

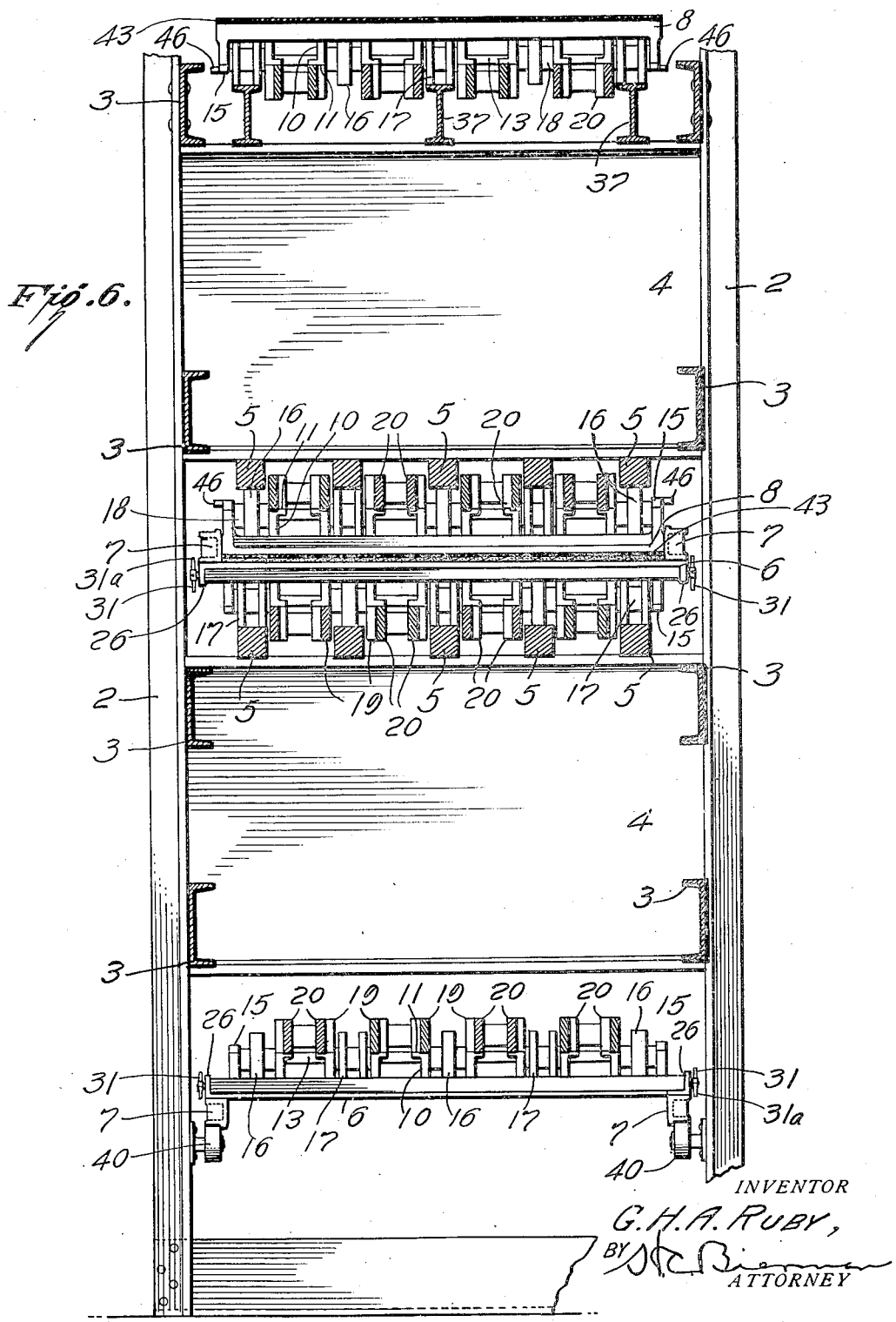

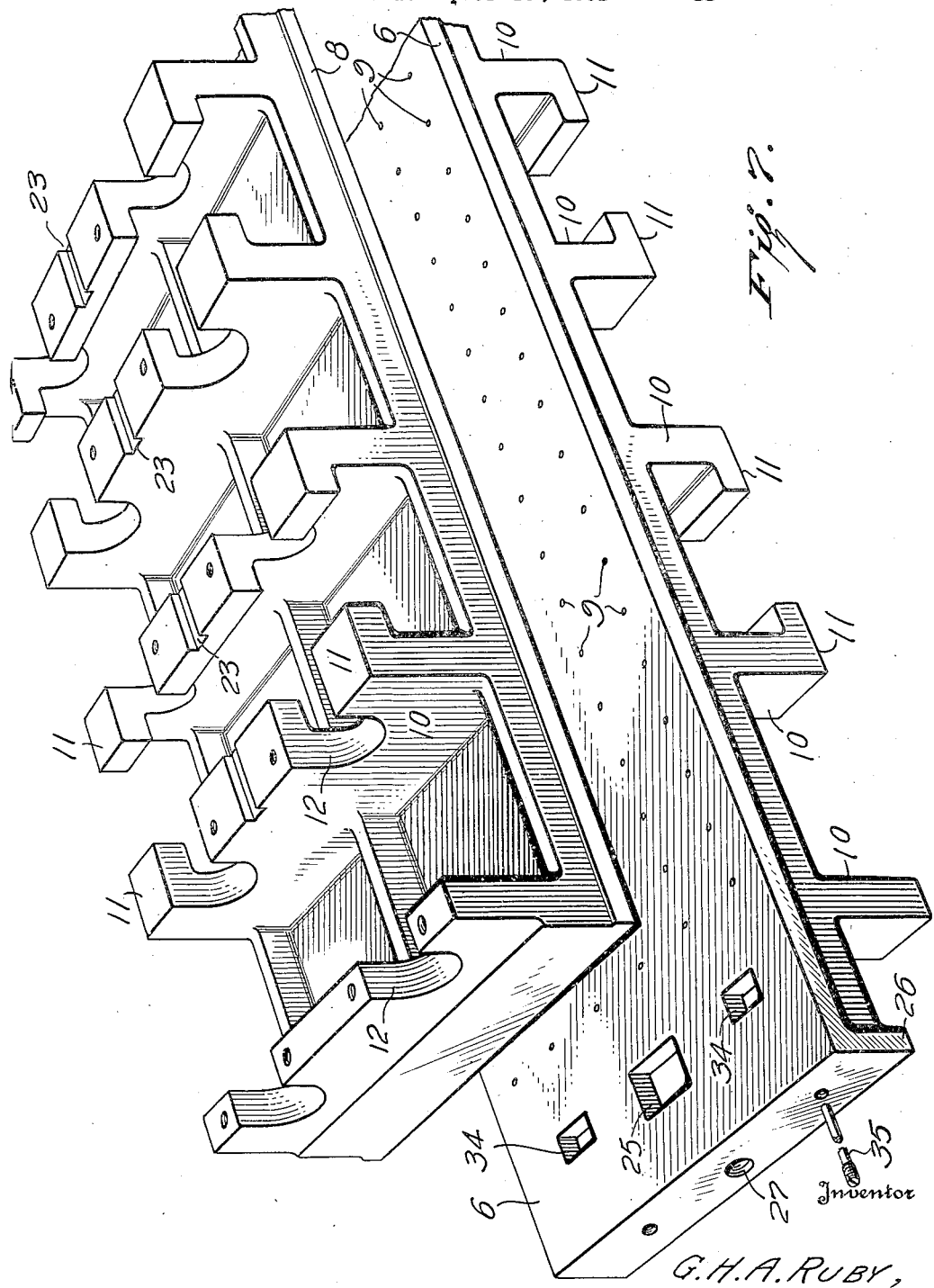

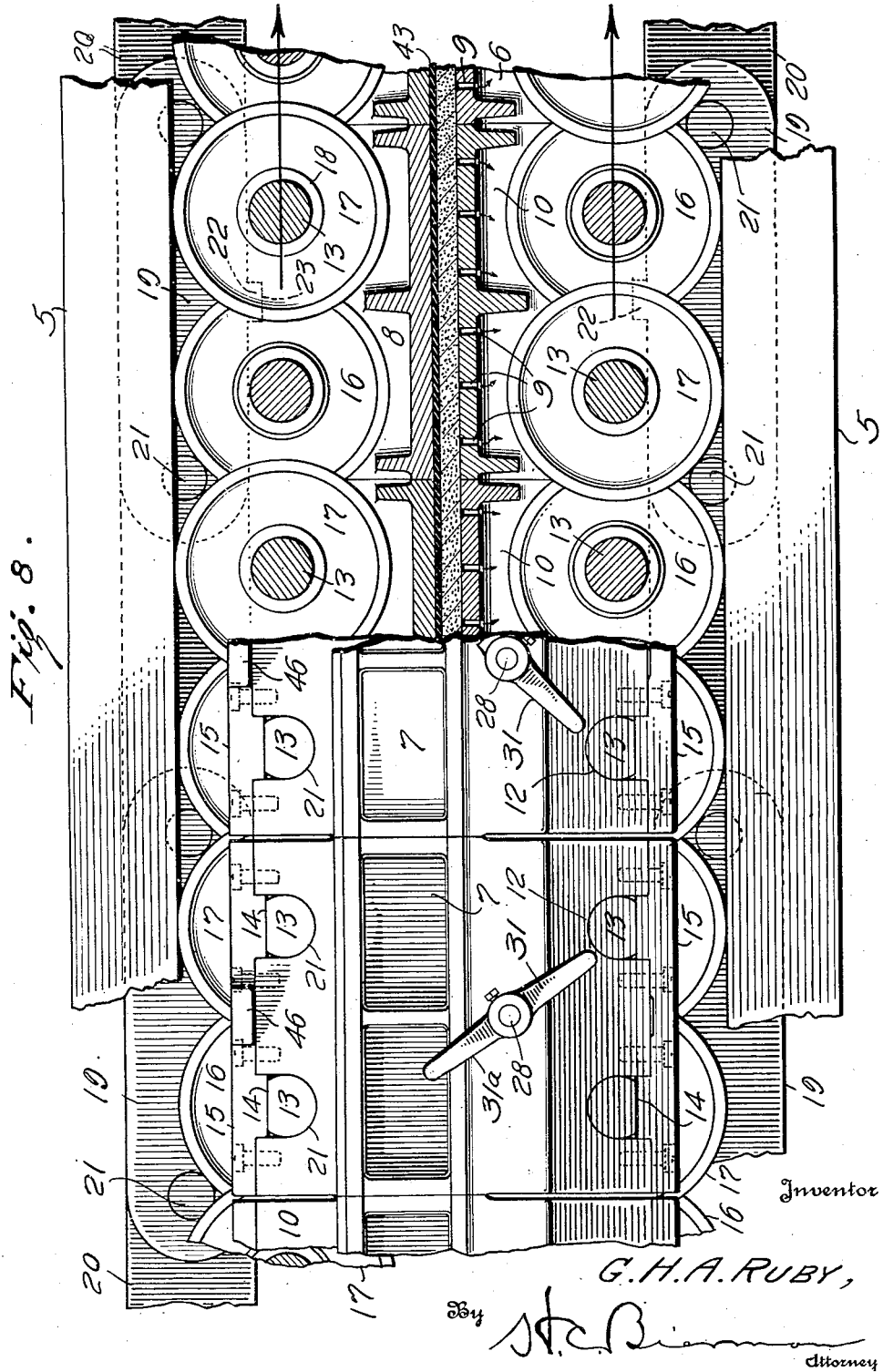

Nov. 7, 1933.   G. H. A. RUBY   1,933,934
BOARD MAKING MACHINE
Filed April 18, 1931    11 Sheets-Sheet 10

Fig. 11.

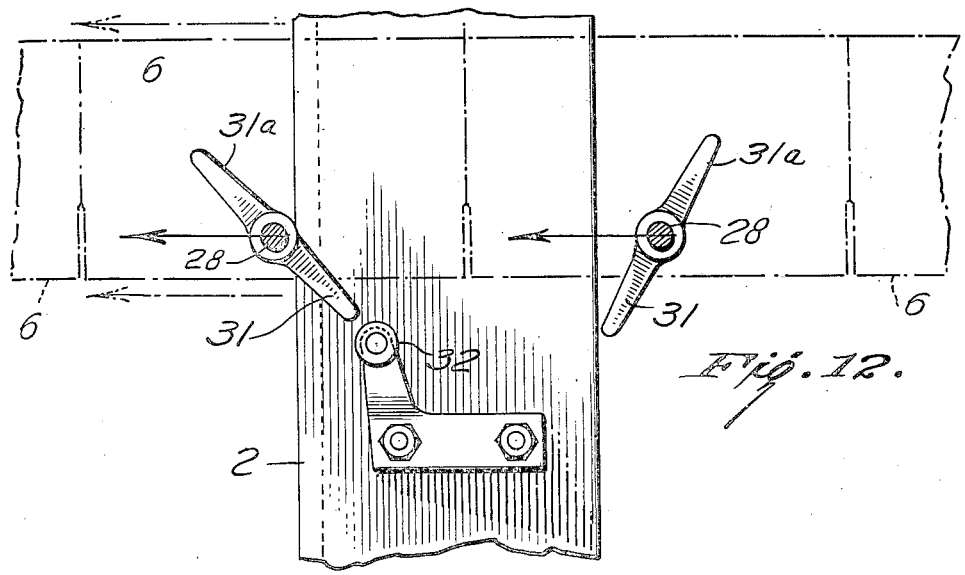
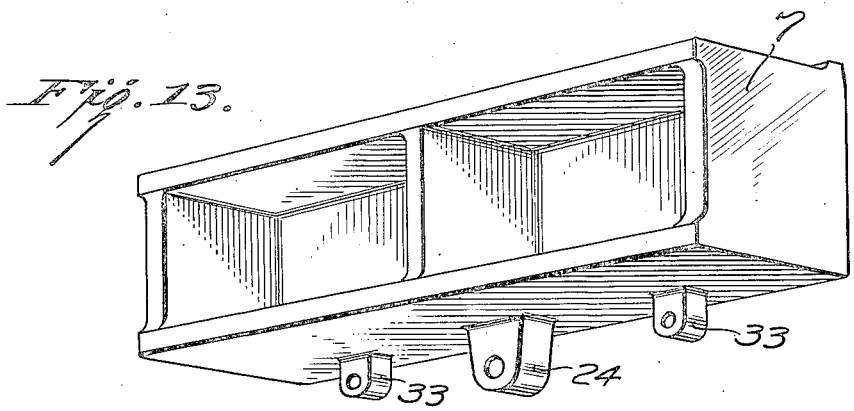
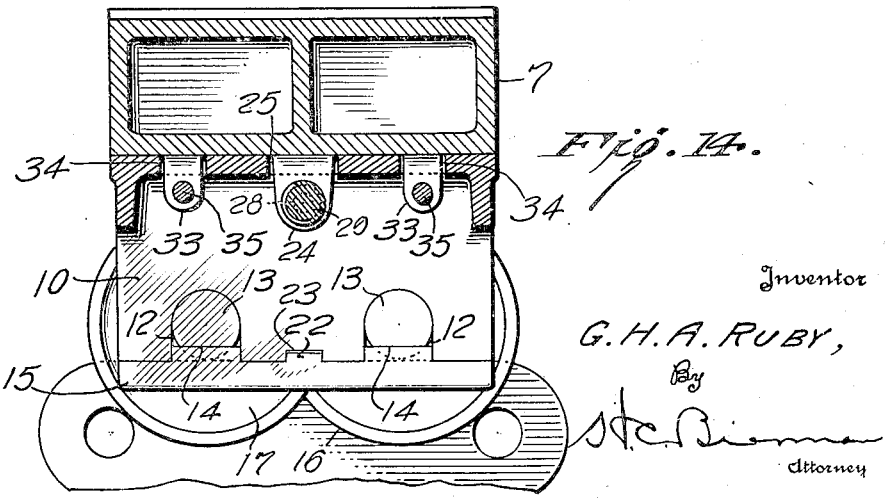

Patented Nov. 7, 1933

1,933,934

UNITED STATES PATENT OFFICE 1,933,934

BOARD MAKING MACHINE

George H. A. Ruby, Grand Rapids, Mich.

Application April 18, 1931. Serial No. 531,155

16 Claims. (Cl. 92—39)

My present invention relates to a method of forming a compressed board either in units or as a continuous process. The invention also contemplates an apparatus for carrying out the above method and the product.

Such a composition in the preferred form may consist of a plastic mixture containing a crystallizable material such as gypsum or the like, with an admixture of a fibrous substance such as paper stock, ground newspapers, or any other equivalent material, accelerator or retarder, fillers, such as clay or the like, and water. As a matter of fact, any composition may be used which, upon applying the requisite amount of pressure, may be caused to set, crystallize or remain in a compressed or closely compacted state when the compression has been removed.

In another form, the plastic mix may consist of such materials as ground up paper stock, straw, wood chips, sawdust, with or without binders such as calcined gypsum, glue sodium silicate, and with or without fillers such as coke, cinders, ground slag or the like. While the invention contemplates the formation of a board composed of these materials, by forming the same under pressure, yet in many cases this pressure need not be such that a set occurs when the peak of maximum pressure has been reached. As a matter of fact, the invention contemplates the production of insulating boards by using a certain amount of pressure where the pressure is used principally to cause dehydration of the stuff. This pressure may be sufficient to cause a set at the peak thereof or the pressure may be such as to go beyond this point, causing further dehydration of the stuff, and upon release of pressure, the stuff may expand or come back to the point where a set will occur. This procedure is particularly applicable to the production of insulating boards of a thickness usually much greater than that desired for a wall board but yet without causing a disruption of the arrangement of the particles composing the mass, with the production of a set due either to the closeness of contact of the materials, the actual setting or hardening of the binder or the mere removal of water where no binder is used, which leaves the particles composing the stuff in more or less intimate contact. Such insulating boards, of course, do not have strength as their primary consideration, and the formation of these boards involving as they do less closeness of contact of the particles than is the case with wall boards, they have a greater insulating value, which is a prime consideration.

The patent to Mantius 1,723,051 granted August 6, 1929 criticizes wall boards made under compression of which that disclosed in the patent to Carmichael 1,539,542 granted May 26, 1925 is a type, and upon which the Mantius patent is an improvement. Mantius states that all prior boards formed under compression expand slightly upon relieving compression, with the result that the board composition was disrupted and weakened thereby. His contribution to the art resided in reaching a point of maximum compression and then holding that compression until the board composition had set. This, he states, prevents expansion and consequent disruption and weakening of the board and maintains the board at the desired thickness until a set has taken place.

I have discovered, as a result of a considerable amount of research and experimentation, that it is possible to so control the amount of compression and the time to which the composition is subjected to that compression, so that the point of set of the composition and the peak of maximum compression will be reached substantially simultaneously. Such a procedure, therefore, permits the release or removal of a portion or all of the compression substantially immediately following the application of the desired maximum pressure on the composition, without causing a disruption or weakening of the thus formed board.

I have also discovered that if a composition is subjected to a desired amount of compression and permitted to set either through crystallization of some of the materials in the composition, adhesion or cohesion between the closely compacted particles, or any other reason which may be applied to the tendency of the compressed composition to remain in that compressed state, the phenomenon which I shall hereinafter refer to as setting, absorbs a considerable amount, if not all of such compression. I have found specifically that if a gypsum composition is permitted to set under a desired maximum pressure and this pressure is not deliberately released, after a period of time, the positive pressure on the composition becomes dissipated, and I believe this pressure is taken up and is borne by the the crystalline structure of the thus formed board by the setting action.

It has also been discovered by me that where an excess amount of pressure is reached at the maximum peak, that is an amount of pressure over and above that which will be completely dissipated and borne by the setting of the compressed material, it is extremely desirable to release this excess pressure from the sides of the board as well as from the top, either successively or substantially simultaneously. I have found that if the side pressure is not released upon setting of the board and the pressure is only relieved from the top or bottom thereof, the board has a tendency to bow or bulge, which has a detrimental effect upon the finished product. This tendency is completely eliminated by releasing the compression from the sides subsequent to setting.

In the above, where I refer to the phenomenon known as setting, I intend this to cover either what I shall term first set or second set. Applying this specifically to a gypsum mix, I have found that a point may be reached where a first set occurs, which means that at this point the material under compression will take up or absorb a certain amount of pressure and no expansion will take place when pressure is released. While it may be properly said that the composition at this point has set, yet it is not in a condition where it may be readily handled. A certain crystalline structure has been built up within the board which I term first set, but if the board were immediately removed from the machine, it would be found to break comparatively easily, and the composition would be found to have a tendency to stick to the mold within which it is formed. If, however, this set material is permitted to remain in the mold for a certain length of time, which must be determined for each composition treated, a second set will occur. When this phenomenon takes place, the board may be readily removed from the mold without sticking or mutilation and it may be handled readily without fear of breakage. This second set may be due to aging, drying, or both, the exact nature of the phenomenon not being entirely understood by me. However, I have conclusively demonstrated that if a board formed as above is allowed to remain in the mold for a length of time, this second set will occur under such conditions that I do not believe it can be caused by drying, but having occurred, the board may be readily handled as it has acquired since the first set a requisite amount of strength and rigidity.

In carrying out a preferred method of procedure, I may mix in any suitable apparatus, a composition which, for instance, may consist of calcined gypsum, fiber and water, with any desired admixture, such as accelerator, retarder, fillers, or the like, to form a plastic mass. It is desirable at this stage of the mixing to supply an excess amount of water in order that the mixture may be readily handled and delivered to a compression chamber of a machine. Where an excess amount of water is used, I prefer to flow the plastic mass into a form and permit a portion of this excess water to drain therefrom without positively forcing the same out of the mass. After this action has been permitted to take place for a desired length of time, I then prefer to subject the partially drained mass to increasing pressure, preferably irregularly increasing pressure, until a desired maximum has been reached and the board has set. I have discovered that when such a plastic mass is mixed with an excess of water, the water will only drain therefrom at a certain rate of speed regardless of the amount of pressure applied within limits. The increment in the pressure must occur, therefore, only at such rates as will permit this excess water to be drained from the compressed mass without causing a disruption or dislodgment of the fibers or particles composing the mass under compression.

As above set forth, I prefer to so gauge the amount of pressure applied to the mass that the set of the board will take place substantially simultaneously with reaching the peak of compression. When that point has been reached, the pressure may then be immediately released on the board, preferably from the sides and the top or bottom, either simultaneously or in the order named.

At this stage of the process, the formed board, having a first set, may be aged until a second set occurs and readily transported to any suitable type of drying kiln or oven, where the last traces of moisture are removed as in the usual procedure. Obviously, where the method is operated as a continuous one, it will be desirable to interpose in the system cutting devices or mechanisms for producing the board in the desired lengths.

A preferred embodiment of the invention in the form of an apparatus, may consist of any desirable form of mixing and delivery apparatus for the mixture which will deliver the same to a form or mold. As shown, this mold may consist of an endless series of platens, preferably perforated, and having side walls thereon so arranged as to form a continuous moving mold.

The material, being fed to this mold in the desired thickness, a portion of the excess water will drain therefrom through the perforations in the bottom of the platens.

After the above action has been permitted to continue for a desirable length of time, the partially drained material moves into what I shall term a compression chamber. This compression chamber is formed of the hereinbefore mentioned endless platens, which I shall refer to as floor platens, because they form in effect the floor of the compression chamber, and a similar endless series of ceiling platens which are opposed to and arranged above the floor platens. As shown, these ceiling platens are arranged to fit between the side walls of the floor platens, and means are provided for causing convergence of the floor and ceiling platens in a rigidly backed and positively actuated manner. In this way the mass in the compression chamber is subjected to gradual and preferably irregularly increasing pressure as the floor and ceiling platens are moved to the outlet end of the machine under the action of any suitable power.

When the desired point of maximum pressure has been reached, means are provided for automatically releasing the pressure on the sides and top of the thus formed board This means may conveniently consist of a mechanism for slightly separating the side walls of the floor platens and for causing a divergence of the ceiling platens from the floor platens.

In the preferred embodiment illustrated, I have shown an impervious web or sheet, such as rubber or the like, between the body of material under compression and the ceiling platens, the latter also being imperforate. This sheet is preferably arranged in the nature of an endless belt to travel completely around the endless run of ceiling platens. The web or belt having a substantially smooth continuous surface, the thus produced board also has a smooth, unbroken, finished surface when removed from the compression area.

As above set forth, the board coming from the compression area has acquired only a first set and I have found that if it is attempted to remove the belt or sheet from the board at this point, there is a tendency for the two to stick together, with consequent damage to the board. If, however, the web or sheet is allowed to remain in contact with the board without being disturbed until a second set has occurred, the belt may then be removed without fear of mutilation to the board and with no tendency to stick.

As shown, I prefer to convey the set board from the compression zone while still supported by the floor platens to a drying kiln or oven, where the excess amount of moisture is dried by means of applied heat. The ceiling platens, the rubber sheet or belt and the floor platens are returned to their initial starting point under any desired power, thus making the operation continuous.

In order to expeditiously move the two sets of platens continuously I prefer to secure a link to the reverse side of each individual platen, the links of adjacent platens being hinged together and passing over a sprocket or sprockets to which power is applied, so that rotation of the sprocket pulls the opposing platens without relative movement between the two, through or over a rigidly backed converging path, thus producing the desired amount of compression. After passing through the compression zone, the platens pass around their respective platens and are returned to the entrance end of the machine in a continuous manner.

The invention further consists in the novel arrangement, combination and construction of parts more fully hereinafter described and shown in the accompanying drawings, together with the details of operating procedure hereinafter set forth.

In the drawings:

Fig. 1 is a diagrammatic view of the compression zone showing at one end the partial drainage zone and the compression release zone at the other end.

Fig. 2 is a diagrammatic fragmentary view of the feeding end of a continuous machine embodying the invention.

Fig. 3 is a fragmentary view of the compression zone of the machine.

Fig. 4 is a fragmentary view of the end of the compression zone of the machine, showing a form of power mechanism.

Fig. 5 is a fragmentary view of the belt return mechanism and the beginning of the transportation zone to the drier or kiln.

Fig. 6 is a transverse sectional view through the compression zone of the machine.

Fig. 7 is a perspective view of individual floor and ceiling platens.

Fig. 8 is a side elevation partly in section, showing the platens and associated parts in the compression zone.

Fig. 11 is an enlarged sectional view of one end of the platens in the compression zone, showing the mechanism for releasing side pressure.

Fig. 12 is a sectional view along the line 12—12 of Fig. 11.

Fig. 13 is a perspective view of one of the floor platen side walls.

Fig. 14 is a side elevation of one of the floor platens and associated mechanism.

Figure 9:
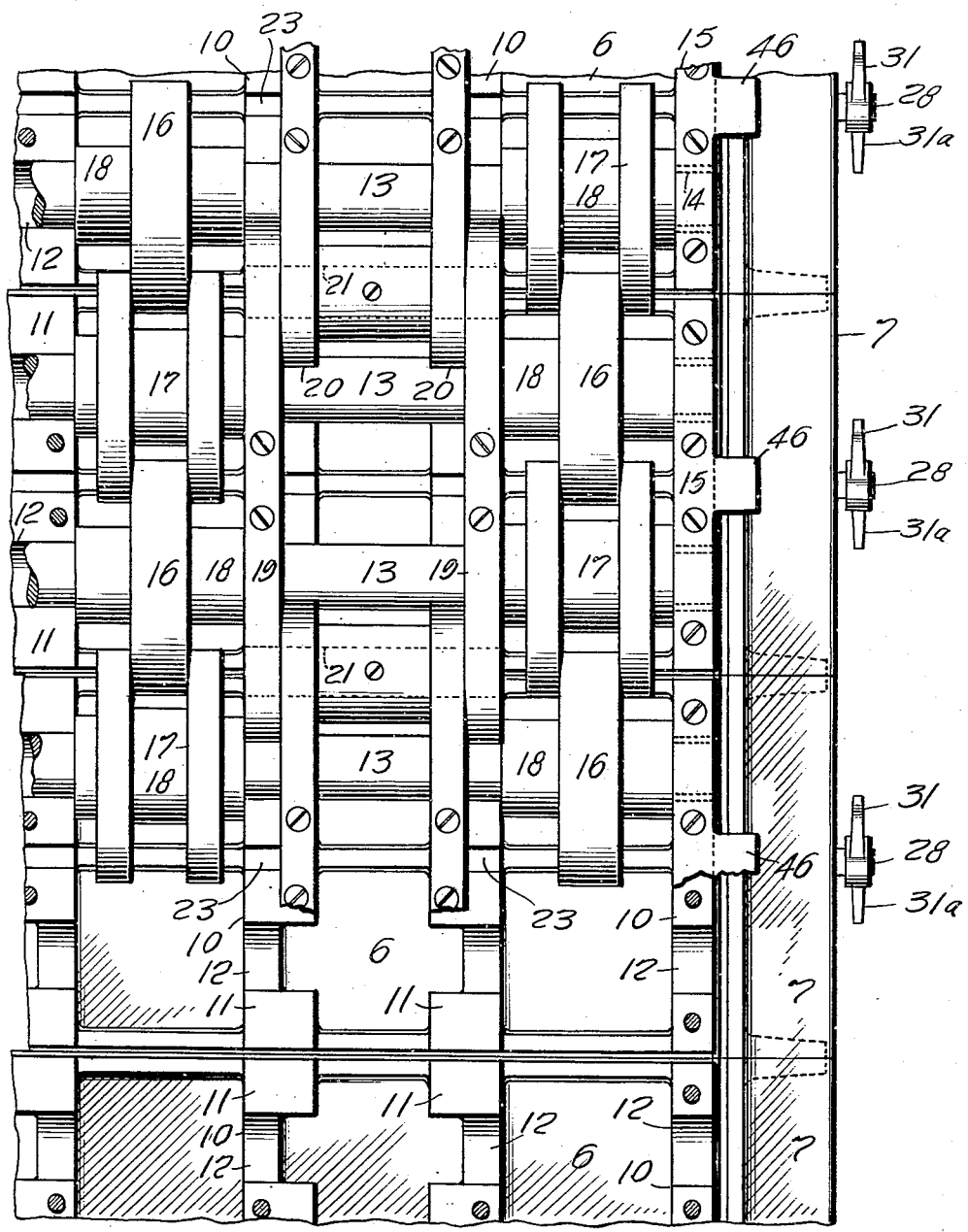
Fig. 9 is a top plan view of one end of the ceiling platens.
Figure 10:
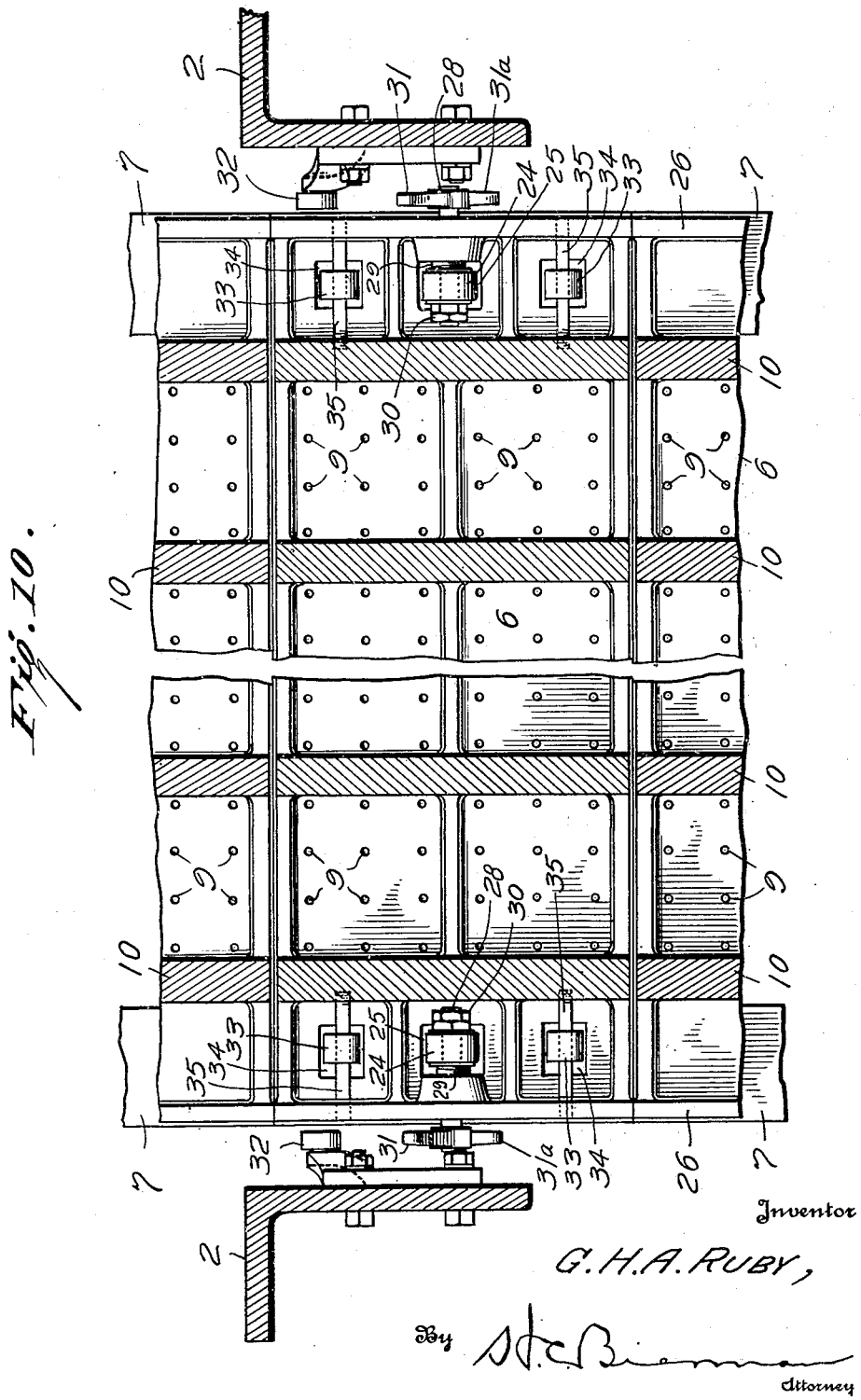
Fig. 10 is a bottom view of adjacent floor platens.

Referring now to the specific embodiment illustrated, there is shown generally at 1 (Fig. 2) a feed device where the mass of which the boards are to be composed, is suitably mixed and delivered to the endless mold located beneath the same, the molds to be more fully described hereinafter. A screed or the like, not shown, may be used to insure leveling of the mass to the proper depth in the molds and consequently a finished board of a proper thickness, the mass passing under the screed and being automatically leveled as the molds proceed into the compression chamber.

The machine itself may consist of upright frame members 2 suitably spaced apart and connected with longitudinal frame members 3 (Figs. 3 and 6) with a desirable number of lateral braces 4, preferably in the nature of I beams secured to the longitudinals 3. The I beam lateral frame members 4 also carry tracks 5. As these lateral frame parts 4 bear most of the up and down thrust as the platens move through the machine, they must of necessity be of very sturdy construction. The pressure increasing as the platens move through the machine, the number of frame members must be suitably increased and placed correspondingly closer together, all as will be fully understood.

The tracks 5 comprise two series of individual bars (Fig. 6) suitably secured to the lateral frame members 4. The lower series of tracks are preferably substantially horizontal, while the upper series converge toward the lower series and then diverge therefrom as shown diagrammatically in Fig. 1. There, for convenience, the figure is laid off in ten foot sections and in lettered zones. The last two sections of the upper track in zone A converge toward the bottom track substantially ¼ inch in each 10 ft. of travel. In zone B, the convergance is reduced to ⅛ in. for 10 ft., and this zone is substantially 10 ft. in length. Zone C further decreases this convergence to substantially 1/16 in. per 10 ft. and the zone consists of two 10 ft. sections. In zone D, the convergence is still further reduced to substantially 1/64 in. in each 10 ft., and the zone is about 20 ft. long. At this point the convergence of the tracks and consequently the convergence of the platens produces maximum compression. Immediately beyond this point, the upper tracks diverge from the lower tracks. This is shown in zone E, where the divergence is substantially ⅛ inch in 10 ft., and the zone consists of substantially 10 ft. of travel. It will thus be seen that the upper and lower tracks converge irregularly to produce irregularly increasing pressure to a point where maximum pressure is reached, and from that point they immediately diverge.

The compression chamber proper is defined by a floor made by an endless contiguous series of floor platens 6 linked together, said platens having side walls 7, and a ceiling comprising a similar endless contiguous series of ceiling platens 8 without side walls. The ceiling platens, however, while the stock is under compression, are included between the side walls of the floor platens as shown in Fig. 6.

Each floor platen is provided with perforations as at 9 through which the excess water in the stock may drain either due to compression or without compression as will be more fully hereinafter described, while the ceiling platens are imperforate.

Each ceiling platen is provided on its reverse face with lugs 10 having an enlarged seat 11 at the end thereof adapted to receive the links which hold adjacent platens together. The lugs and seats are provided with axle bearings as at 12 (Fig. 7) adapted to receive the roller axles or shafts 13 (Fig. 11). Each of the latter is provided at each end thereof with a flattened portion 14 which is engaged by a bearing plate 15 secured to the end lugs 10. These bearing plates effectively prevent accidental dislodgement of the roller shafts and at the same time prevent them from having rotative movement in their bearings.

Single and double rollers 16 and 17, respectively, are carried by the axle shafts 13 of the ceiling platens, alternating laterally of the machine (Fig. 11) and are so arranged widthwise of the platen that they telescopically overlap (Fig. 9). This is necessary as the diameter of each roller is greater than the distance between axle centers. The hub portion 18 of each roller is so proportioned that it spans the distance between lugs 10. The roller treads engage the series of tracks (Figs. 6 and 11).

The platens constituting the ceiling series, are arranged contiguous to each other so as to form an unbroken or continuous ceiling (Fig. 9) and are secured to each other in a pivotal manner. This mechanism may conveniently consist of outside links 19 secured to that portion of the enlarged seat 11 immediately over the platen lugs 10, and inside links 20 secured on the overhanging portion of the enlarged seat 11 of the lugs. The length of these links are so proportioned that they overlap with the neighboring link on the adjacent platen and the overlapping portions are hinged together as by a pin 21 (Fig. 8), the center of the pin being exactly over the juncture between adjacent platens. Each link carries at the bottom thereof a stud 22 adapted to seat within the recess 23 cut into the top of the enlarged seat 11 on the platen lugs. Thus, the pull of the chain composed of the links, is not borne by the screws or fastening means by which the links are secured to the platens, but on the contrary, is borne directly by the link stud against the wall of the stud recess.

As the mechanism as to rollers, links and associated parts are the same for the floor platens as for the ceiling platens, the same reference characters have been applied to these parts, regardless as to which series of platens they are on.

The platens constituting the floor series are provided with a bed or face of greater width than that of the ceiling platens in order to accommodate thereon the side wall 7 (Fig. 11). This side wall may consist (Fig. 13) of a substantially hollow element having a depending lug 24 extending into a slot 25 at the ends of the floor platens 6. The extreme ends of the floor platens 6 are provided with a thickened portion 26 threaded as at 27, preferably with square, coarse threads (Fig. 11). Into this threaded aperture there is secured a release shaft 28 having a threaded portion 29, a nut 30 and release lever 31. The release shaft 28 passes through the aperture in the lug 24 and the lug itself is held securely between the end of the threaded portion 29 and the nut 30. Therefore, as the release lever 31 is moved either clockwise or counter-clockwise, the side wall 7 will be moved inwardly or outwardly, depending upon whether a right or left hand thread is used. Specifically, the release levers and associated mechanism shown in Fig. 8 are provided with left-hand threads so that at an appropriate period, that is, when the point of maximum compression has been reached, the release lever 31 in each platen will pass over a trip 32 which will cause partial clockwise movement of these levers. This causes a consequent unscrewing of the threaded portion 29 and consequent outward movement of the wall 7. This is for the purpose of releasing pressure on the formed board from the side. In order to insure that the movement of the wall 7 shall be true, and to assist in maintaining the rigidity thereof, I prefer to provide guide lugs 33 (Figs. 13 and 14), which likewise project into suitable apertures 34 in the floor platens, the lugs riding upon guide pins 35.

Obviously, it may be desirable to provide a duplicate release lever and associated mechanism at the opposite end of each floor platen so that both side walls may be released simultaneously as the release levers are tripped.

Each lever 31 is also provided with an extending portion 31a which when the platens are returned in an upside down manner are engaged by a trip to move them and the side wall attached thereto into their initial position.

When the ceiling platens pass out of zone E (Fig. 4), the links thereon are engaged by a sprocket or sprockets 36 suitably mounted and driven, and each platen is carried around the sprocket 36 to the top of the machine where the rollers thereon engage an I beam or the like 37 (Fig. 6) for return to the starting point of the machine.

At this point the compressed board has been freed of the ceiling platens, although it still rests upon and is supported by the floor platens. These floor platens may then travel in the same horizontal direction for any desired extent (Fig. 4) while the board is permitted to acquire its second set and thus make it handable. After this desired result has been accomplished, the platens may then pass over a return sprocket 38 (Fig. 5) for return to the starting end of the machine. A suitable conveyer 39 at this point receives the board directly from the floor platens for carriage to a drying kiln or oven as is well-known in this art. A suitable form of severing mechanism may be interposed at any desired place after the board has been formed in order to sever the same into the desired lengths. It is well known, however, that the board, even after it has completely set, contains a considerable amount of excess water and this must be driven out by means of externally applied heat. This is accomplished in the oven or drier.

After the floor platens pass around their return sprocket 38, return rollers 40 (Fig. 6) secured to the uprights 2 of the machine, receive the platens by engagement with the top of the side walls 7 and the series of platens are thus returned to the starting end of the machine.

At the starting end of the machine the floor platens are brought into the proper position by means of sprocket 41 and the ceiling platens pass around sprocket 42 and the operation is repeated in a continuous manner.

I have found that it is desirable to interpose between the top of the plastic mass and the bottom of the ceiling platens, an imperforate smooth rubber belt. This belt is shown at 43 as passing in an endless manner around the pulley 44. Therefore, as the mass enters the compresion chamber, the belt rests directly on top of the mass and the ceiling platens rest upon the belt. This relation continues throughout the compression chamber and zones and until the ceiling platens are returned around the sprocket 36. At this point, the belt cannot be removed from the formed board because in its condition of first set, its surface is still somewhat sticky and the belt removal would cause a mutilation of the board surface, for this reason, I prefer to maintain contact between the board and belt on down the machine to some point, say, just prior to the discharge of the formed board onto the conveyer for carriage to the drier or whatever the second set occurs. In Fig. 5, a pulley 45 returns the belt to the starting end of the machine.

I have found that in order to expeditiously handle the mass, a considerable amount of water must be initially mixed therewith. Of course, a great deal of this water must be removed even before the mass is put under compression. I have found that this water may be permitted to drain without pressure and hence for this reason, I permit travel of the bottom platens which constitute the endless mold for a distance before the top platens contact with he plastic mass. This is clearly shown in Fig. 1 and I have indicated that this condition exists through, say, the first 20 ft. of travel of the ceiling platens. During this portion of travel, a lug 46 on the bearing plates of the ceiling platens engages, and each platen is thus supported by, an angle iron 47 (Fig. 11), which effectively holds the ceiling platens away from the plastic mass. As soon as a sufficient amount of water is drained therefrom, which is determined by the speed of the machine and the amount of travel permitted, the lugs 46 ride off of the angle irons 47 and at this point the rollers on the ceiling platens ride beneath the tracks 5 and positive compression begins.

In constructing the machine as above described, it will be obvious that in some instances it may be desirable to reverse the rollers and their tracks, that is, instead of having the platens carry the rollers, the platens may carry the tracks and the rollers may be mounted upon the framework of the machine.

Obviously the device may be operated by any suitable power mechanism, one form of which is shown conventionally.

It will be seen from the above that a mass being fed from the feed device into the open molds constituted by the floor platens and their side walls or side plates, is first permitted to drain for a certain length of time, then the mass is covered by the imperforate rubber belt and then the ceiling platens engage the top of the rubber belt and by reason of the converging tracks, the ceiling platens are made to approach the floor platens in a gradually but irregularly increasing manner. During the passage of the mass through the machine, pressure builds up while water is squeezed therefrom until a point is reached where maximum pressure exists and the board sets. This set may be due to crystallization of one of the ingredients, such as gypsum, or closeness of contact where a fibrous material is being compressed or where a binder, gummy or otherwise, finally hardens. I think it important, however, at least in the preferred form of the invention, where a board of maximum strength is desired, that the set of the material should occur substantially simultaneously with the reaching of the point of maximum pressure. When this point has been reached, the release levers are tripped, the side plates on the floor platens move apart slightly, thus releasing any excess pressure and preventing the formed board from bowing or bulging. Either immediately subsequent thereto or simultaneously therewith, the divergence of the ceiling platens from the floor platens begins, which consequently releases all pressure on top of the board. From this point on, the board travels through the machine without any pressure thereon, and as the first set has already taken place, no further compression is necessary, nor will there be any disruption of the formed board due to release of pressure at this time.

In a modified method of carrying out the invention it may be found desirable to make no attempt to calculate the passage of the board through the machine so that the point of set and the point of maximum pressure will be reached simultaneously. This is not absolutely essential in order to make a good board. For instance, it may be found desirable in some instances to continuously increase the amount of pressure placed upon the board even after set has occurred. This may be done without fear of disrupting the board provided an excess amount of pressure is not used as I have found that in working with high pressures when the board has been subjected to a certain amount of pressure, say, 750 lbs. per sq. in. and a thickness of say ⅜″ has been secured no further appreciable diminution may be made in its thickness, particularly where the board contains a high percentage of gypsum, even by increasing the amount of pressure thereon up to 1,000 lbs. per sq. in. It will, therefore, do no harm in such a board to continue the pressure beyond the point at which the board has set, although as I have above set forth, this is not necessary.

As another alternative, it may be desirable in some instances to have the point of maximum pressure reached before the board has set and then to permit the platens to slightly diverge the consequent slight expansion of the board, the set occurring during the divergence of the platens.

This alternative is particularly desirable where boards of a thickness greater than those normally desired for wall board purposes are being manufactured. Such boards may consist of paper stock alone in water either with or without a binder, straw or hay, with or without a binder, chips or sawdust, with or without a binder, or any admixtures of the above, either with or without fillers such as cinders, coke, ground slag or the like. These boards have particular value in the art as insulating mediums.

In the manufacture of the above compositions, it is desirable to apply a certain amount of pressure in somewhat the same manner as is disclosed for the wall boards. When the peak of predetermined pressure has been reached, if the pressure were removed at this time, a set would occur. However, at this point the board contains an excessive amount of water. I therefore desire to continue the pressure, which has the effect of decreasing the thickness of the board and removing an equivalent amount of water. This materially decreases the cost of that portion of the operation which involves the drying of the board by applied heat. This excess amount of pressure causes a decrease in the thickness of the board beyond the point where it will absorb that pressure, and hence, when the pressure is removed, there will be a springing back of the board to an increased thickness. Where boards are being made for insulating purposes, and strength is not of prime consideration, this is not detrimental and so it may be permitted, particularly where the board is formed in a continuous manner, and I have found that the operation may be so performed that no disruption of the thus formed and expanded board will take place. Such boards are comparatively light, have great insulating value and sufficient strength to enable them to be handled without undue fear of breakage although, of course, they do not have the strength of boards of the wall type formed according to the preferred embodiment of the invention.

As above set forth, I may make various types of boards on a machine of this invention and hence I do not intend to limit the mass or mixture to a gypsum mix or a mix which includes a crystallizable material or a binder, but on the contrary it is to be understood that such a phrase indicates only stuff and a liquid, the excess amount of liquid to be removed by compression.

As a specific example of the manufacture of wall boards according to the invention, and where strength is of primary importance, I may prepare a mix as follows. A mass is secured consisting of approximately 33% by weight of ground up paper stock, the remainder being principally calcined gypsum. The paper pulp is mixed with water to give approximately what I may term a 3¼% consistency. By this I mean that each 100 lbs. of the paper water mix contains 3¼ lbs. paper. With this paper mix, the gypsum is incorporated and poured into the mold to a depth of about 3⅝ inches. Immediately the mass starts to drain, and without subjecting the same to pressure, I have found that the mass will drain to approximately 3⅛ inches in thickness. At this point, pressure is applied. The flow of water through the mass must be only such that it will not cause removal of any of the gypsum or the paper and this flow of water is, of course, controlled by the amount of pressure applied thereto. In other words, the pressure must be applied gradually, dependent upon the type of material undergoing treatment, and this pressure may vary accordingly. Obviously, where a gypsum mix is undergoing pressure, the water will drain much slower than where a straw water mix is being treated.

In the above example, pressure is built up to approximately 500 lbs. per sq. in. When this maximum pressure has been reached, it has been found that the board has reached a thickness where the composition undergoes a first set and the board structure will maintain this pressure without springing back. For the above composition and pressure the thickness of the board at this point will be approximately ½ inch. From this point, the board passes out of the compression chamber and is permitted to remain on the floor platens with the rubber belt or web in contact therewith until a second set has occurred. At this point the belt may be removed without fear of mutilation of the board, and the latter passed to a cutting machine or the like and from thence to the kiln for complete drying.

In using the above composition, if only 250 lbs. pressure were used, the board would only be compressed to approximately ⅞ inch. Upon release of this pressure, the board would spring back or extend to approximately ⅝ inch. In some instances, this may be found desirable, but such a board will of necessity be much weaker in tensile strength than a board compressed to ½ inch under a pressure of 500 lbs. per square inch. On the other hand, if 750 lbs. pressure is used, the board may be compressed to ⅞ inch, which upon release of the pressure will come back to about ½ of an inch. This board will have a tensile strength approximately the same as the board produced under 250 lbs. pressure, which is less than that formed under 500 lbs. pressure. The 750 lb. pressure board, however, has the added advantage that it is further dehydrated under the excess pressure and hence requires less applied heat in the kiln or drying operation. A board as above set forth made under a pressure of 500 lbs. per square inch, where the first set occurs at approximately ½ inch of thickness, will have a uniform modulus of rupture between 850 and 1750 lbs. per square inch.

I believe the consistency of the paper water mixture of 3¼% is important. The mixture must be such that when the gypsum is added, the mass will be self-leveling. By increasing the consistency of the paper water mix to 6%, this self-leveling feature is destroyed. This means that the material will not seek its own level but must be manually spread into the mold to the required depth. As water begins to drain immediately the stock is placed in the mold, the delay in securing a uniform level, and the physical act of pushing the stuff to various parts of the mold, results in what is known as a spotted board, that is, a non-uniform texture. Of course, where strength is not important, a heavier paper water mix may be used.

A wall board may be made according to this invention where strength is still of primary importance, without the use of gypsum at all. Such a board may consist solely of a paper water stock. I have found it desirable in this instance to make use of an 8% consistency, that is, where each 100 lbs. of the paper mix contains 8% solids. This mix being flowed into the mold and leveled by means of the screed when subjected to 500 lbs. pressure to get a half inch board, a first set will occur, and a very favorable board results. This board is comparable in all respects with the gypsum boards above referred to made under 250 lbs. or 750 lbs. pressure. While its strength is not as great as the gypsum board under 500 lbs. pressure, and ½ inch in thickness, yet it is a satisfactory board for many purposes.

As an example of an insulating board where strength is not of prime importance, but on the contrary a board is desired which will efficiently insulate from heat and cold, a mix may be made consisting of 40% paper used as a 4% consistency with a 40% filler which may be fibrous such as straw, sawdust, shavings, hay or the like or a non-fibrous material such as coke, cinders, ground slag or the like, and 20% gypsum. This mix being filled into the molds, pressure is applied to the extent of 500 lbs. per square inch to cause dehydration and closeness of contact of the particles. This pressure results in carrying the stuff to a thickness of approximately ⅞ inch. Upon release of pressure, the board will come back to one inch and at this point first set will occur. The treatment from this point is substantially the same as that set forth for wall boards. This board, upon completion of the treatment, will have requisite strength to enable it to be handled without fear of breakage and will have great insulating value.

As another example of an insulating board where no gypsum is used, I may make a mix consisting of 50% paper stock of a 4% consistency with 50% of any of the above fillers, the procedure as to pressure being substantially as above. This board has substantially the same characteristics as the gypsum insulating board last referred to.

Many other compositions of insulating boards may be made according to the present invention, other than the specific composition above given. I therefore do not wish to be limited to any particular composition in combination of the ingredients herein referred to but on the contrary, any insulating board is to be considered as coming within this invention if the stuff is mixed with water, subjected to pressure to compact the stuff and remove water, and the finished dried board has a thermal transfer rate, not greater than .4 B.t.u. per hour per 1 inch board thickness per degree Fahrenheit difference between the board sides.

In all cases, both as to wall boards and insulating boards above set forth, it is preferable to operate the machine so that the stuff travels through the compression chamber from 20 to 60 feet per minute, preferably 30 feet per minute.

Of course, in the formation of insulating boards, various thicknesses may be secured either by varying the pressure on the board or by increasing the amount of stuff initially fed to the molds.

Obviously where an insulating board is being manufactured and it is not necessary to secure perfectly smooth surface thereon, the rubber belt may be removed immediately at the end of the compression zone. This cannot be done, however, where a mix including gypsum is used, for the reasons already stated. Where, however, a board is made of straw or the like, somewhat resembling the well-known Cellotex board, this belt may be removed at the end of the compression zone without fear of mutilation of the board.

While several specific embodiments of the invention have been shown and described with particularity, yet obviously I do not wish to be limited thereto, but the invention is to be construed broadly and limited only by the scope of the claims.

I claim:

1. A method of forming a compressed composition board which consists in mixing a composition including crystallizable material with an excess amount of water, feeding the mass to a compression chamber, subjecting the mass therein to increasing pressure while permitting water to drain therefrom, and until crystallization takes place and the thus formed board has set.

2. A method of forming a compressed composition board which consists in mixing a composition including a crystallizable material with an excess amount of water, feeding the mass to a compression chamber, subjecting the mass therein to increasing pressure while permitting water to drain therefrom, until a desired maximum pressure has been reached and crystallization has taken place, and then releasing the pressure on the thus formed board.

3. A method of forming a compressed gypsum board which consists in mixing a composition including calcined gypsum with an excess amount of water, feeding the mass to a compression chamber, subjecting the mass therein to increasing pressure while permitting water to drain therefrom and until crystallization and hydration of the calcined gypsum has taken place, and the thus formed board has set.

4. A method of forming a compressed composition board which consists in mixing a composition with an excess of water, feeding the mass to a compression chamber, subjecting the mass therein to increasing pressure while permitting water to drain therefrom, and until the board has set, and then releasing the pressure from the sides and face of the thus formed board.

5. A continuous method of forming a compressed composition board which consists in continuously mixing a composition including calcined gypsum with a quantity of water in excess of that needed to cause gypsum crystallization, continuously feeding the mass to one end of an elongated compression chamber, continuously moving the mass through said chamber, continuously subjecting the mass therein to irregularly increasing pressure until the board has set and while permitting the water to drain therefrom, and then releasing the pressure from the sides and face of the thus formed board.

6. A board forming machine comprising a compression chamber having a floor and a ceiling, each composed of adjacent platens, means for causing convergence of the floor and ceiling platens comprising tracks and the track engaging rollers, one of said sets of platens having a laterally movable side wall, and means to cause relative movement of the rollers and tracks and consequent convergent movement of the floor and ceiling platens.

7. A board forming machine comprising a compression chamber, having a floor and a ceiling, each consisting of adjacent platens, rollers carried by each platen, spaced apart top and bottom tracks adapted to be engaged by the rollers on the ceiling and floor platens respectively, said top and bottom tracks having convergent portions, said floor platens having a laterally movable side wall, and means to move the platens and their rollers along said tracks.

8. A board forming machine comprising a compression chamber having a convergent floor and ceiling, each composed of adjacent platens, spaced apart top and bottom tracks, track engaging rollers, means to cause relative movement between the rollers and tracks and consequent convergence of the floor and ceiling platens, each of one series of platens having a laterally movable side wall constituting a side wall of the compression chamber, and means to move the side wall of each of said platens laterally as that platen reaches the point of maximum proximity to its opposing platen.

9. A board forming machine comprising a compression chamber having a convergent floor and ceiling, each composed of adjacent platens, spaced apart top and bottom tracks, track engaging rollers, means to cause relative movement between the rollers and tracks and consequent convergence of the floor and ceiling platens, each platen having on one face thereof lateral ribs, a plurality of axle shafts mounted thereon, the track engaging rollers being mounted on said shafts, the diameter of each roller being greater than the distance between shaft centers.

10. A board forming machine comprising a compression chamber having a convergent floor and ceiling, each composed of adjacent platens, spaced apart top and bottom tracks, track engaging rollers, (means to cause relative movement between the rollers and tracks and consequent convergence of the floor and ceiling platens, each platen having on one face thereof lateral ribs, a plurality of axle shafts mounted thereon, the track engaging rollers being mounted on said shafts, the diameter of each roller being greater than the distance between shaft centers, a roller on each axle shaft straddling its neighbor on an adjacent axle shaft.

11. A board making machine comprising a frame, a compression chamber having convergent floor and ceiling portions, each composed of a series of platens hinged together to form two endless runs, the floor platens being perforate, the ceiling platens being imperforate, sprockets carried by the frame for moving each series of platens in a direction having a horizontal component and for returning the platens to their starting point, an endless flexible imperforate belt having a portion located within the compression chamber and between the floor and ceiling platen, the belt passing completely around the endless run of the ceiling platens.

12. A board making machine comprising a frame, a compression chamber having convergent floor and ceiling portions, each composed of a series of platens, each platen being secured to a link extending beyond the lateral edges thereof, the extending end of one link being pivotally secured to the overlapping end of the link on an adjacent platen, so as to form an endless run of ceiling platens and an endless run of floor platens, sprockets carried by the frame and engageable with the platen links for moving each series in a direction having a horizontal component and for returning the platens to their starting point, each platen carrying a series of rollers on one face thereof, spaced apart convergent tracks carried by the frame and engageable by the rollers and means to rotate the sprockets.

13. A board forming machine comprising a frame, a compression chamber therein having convergent floor and ceiling portions, composed of perforate and imperforate platens respectively, hinged together to form two endless series, sprockets carried by the frame and engageable with links carried by the platens for causing movement of each platen series, each platen having lateral ribs on one face thereof, a plurality of axle shafts carried thereby, a series of rollers on each axle shaft, spaced apart and convergent ceiling tracks and floor tracks carried by the frame, the rollers of the respective platens being engageable with the respective tracks, the floor platens having side plates extending outside of the ceiling platens, a return rail carried by the frame above the compression chamber and engageable with the ceiling platen rollers for returning the ceiling platens to their starting point, and return rollers secured to the frame below the compression chamber and engageable with the floor platen side plates, to return the floor platens to their starting point, an endless flexible belt arranged around the endless run of ceiling platens, and means to rotate the sprockets.

14. A method of forming a compressed composition board which consists in mixing a composition with an excess of water, feeding the mass to a compression chamber, subjecting the mass therein to pressure while permitting water to drain therefrom, permitting the board to set, releasing the pressure from the sides of the thus formed board while pressure is maintained on the face thereof, maintaining the pressure on the face of the board until the internal pressure of the board has been dissipated and subsequently releasing the pressure from the face of the board.

15. A board forming machine comprising a compression chamber having a convergent floor and ceiling, each composed of adjacent platens, means to move the floor and ceiling platens in a direction having a horizontal component and positive means to hold the ceiling and floor platens apart during a portion of the horizontal movement comprising a stationary track engaged by said ceiling platens during said portion of the horizontal movement.

16. A board forming machine comprising a compression chamber having a convergent floor and ceiling, each composed of adjacent platens, means to move the floor and ceiling platens in a direction having a horizontal component and positive means to hold the ceiling and floor platens apart during a portion of the horizontal movement comprising lugs carried by the ceiling platens and a stationary track with which said lugs engage during said portion of the horizontal movement.

GEORGE H. A. RUBY.